No. 861,753. PATENTED JULY 30, 1907.
H. C. MOORE.
TOY.
APPLICATION FILED APR. 2, 1907.

Witnesses
P. H. Martin.
V. E. H. Cone.

Inventor
Hiram C. Moore,
by Webster & Co.
Attorneys

UNITED STATES PATENT OFFICE.

HIRAM C. MOORE, OF SPRINGFIELD, MASSACHUSETTS, ASSIGNOR TO MYRON A. GILMAN, OF WESTFIELD, MASSACHUSETTS.

TOY.

No. 861,753.　　　Specification of Letters Patent.　　　Patented July 30, 1907.

Application filed April 2, 1907. Serial No. 365,914.

*To all whom it may concern:*

Be it known that I, HIRAM C. MOORE, a citizen of the United States of America, residing at Springfield, in the county of Hampden and State of Massachusetts, have invented a new and useful Toy, of which the following is a specification.

My invention relates to improvements in toys and to that class of toys in particular in which the likeness in some form, as the image or picture, of a living creature is arranged in an inclosure; and the object of my invention is to provide a simple and inexpensive toy which comprises the effigy of a living object within a cage or other confining or inclosing device, and which can be so manipulated as to cause such object to simulate the motion or movement of its living prototype, such motion or movement being life-like and realistic in appearance.

Although this invention may be made up in different ways and out of different materials, I get the best results from and prefer to employ in its organism a cage consisting of a bottom or floor and wire mesh above such bottom or floor, and the effigy of a mouse, the image rather than the picture although the latter might be used, within such cage. By manipulating the bent rod or wire to which the mouse is attached, and which with the other two members, that is, the cage and the mouse or their equivalents, constitute my invention, said mouse is given the appearance of running round and round in its cage, as will be made clear from the following description, taken in connection with the accompanying drawings, in which—

Figure 1:
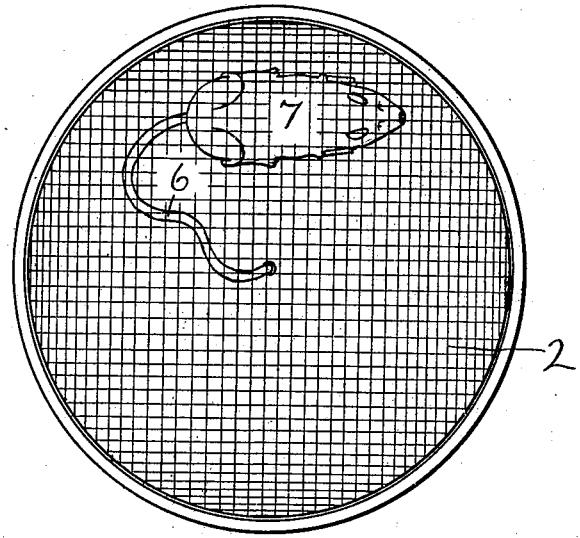
Figure 2:
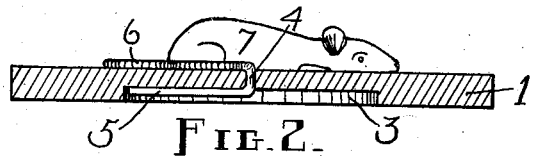
Figure 3:
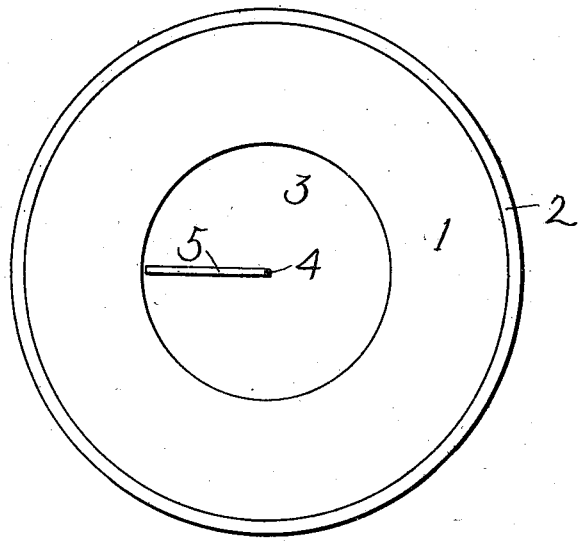

Figure 1 is a top view of an embodiment of a preferred form of my device; Fig. 2, a central vertical section through the floor of said device, and, Fig. 3, a bottom view of the device.

Similar figures refer to similar parts throughout the several views.

The cage is here represented as consisting of a base, bottom or floor piece 1, and a cover piece 2 of wire mesh forming the sides and top of the cage. These parts may be held together by frictional contact or fastened together positively in any suitable manner, as desired. The upper surface of the floor 1 is flat and smooth by preference, while the under surface is cut out around the center to form an annular recess 3. An angular rod or wire 4 passes through a central hole in the floor, and has one part 5 located below said floor in the recess 3 and another part 6 lying along the top of the floor. A "mouse" 7 is fastened to the outer end of the part 6 of the wire 4, preferably in such a manner that such part forms the tail of the mouse this portion of said wire being curved so that it resembles the tail of the rodent quite closely. It will now be seen that, since the mouse is attached to the outer end of that part of the operating wire which is above the floor, any movement imparted to said wire will be communicated to the mouse, hence if the wire be rotated the mouse will be caused to move round on the inside of the cage near the edge in the same direction and have every appearance of running as viewed through the mesh of the cover piece. The part 5 of the wire 4 serves as a convenient medium for rotating the wire and producing the running effect on the part of the mouse, and also acts as a fastening means to retain the wire in place in the floor piece. The edge of the recess 3 affords a guide for the finger of the operator while turning the wire, moreover, said recess furnishes a place of reception for the part 5 which is above the plane of the bottom surface of the floor 1, so that such part is entirely out of sight when the cage is resting on a flat surface, and there is nothing to prevent said cage from resting evenly on such a surface.

The running effect is heightened by giving to the effigy an appearance which is suggestive of motion.

Although a mouse is shown the effigy of some other creature may be substituted, and as hereinbefore intimated some other kind of inclosure may be used. Furthermore the wire for operating the device need not necessarily serve also in the capacity of a tail for the creature, but can be connected with the same at any convenient point.

What I claim as my invention, and desire to secure by Letters Patent, is—

1. A toy comprising a base having unobstructed upper and lower faces lying in parallel planes, with an opening through its central portion forming a bearing for the rotating member, a rotating member mounted in said bearing and having arms projecting adjacent the bearing parallel with the planes of the base one above and one below the base, whereby movement of the rotating member through the base is prevented, and an effigy mounted on the arm above the base, the arm below the base being adapted to be manipulated to rotate the rotating member, substantially as shown.

2. A toy comprising a base piece, an angular rod rotatably mounted in such piece and adapted to be operated from below the same, that part of said rod which is above said base piece simulating the tail of a living creature, and the effigy of such creature attached to the tail part of the rod, the arrangement being such that said effigy is caused to move in a circle when the rod is manipulated from below.

3. A toy comprising a base piece recessed on the under side to form an annular finger guide, an angular rod rotatably mounted in such piece and having an operating part lying in the recessed portion of the same, and the effigy of a living creature attached to said rod above said base piece, the arrangement being such that said effigy is caused to move in a circle when the rod is manipulated from below.

4. The combination, in a toy, of a cage consisting of a base or floor piece and an open-work cover piece, an angular rod mounted to rotate in said base piece and having a part below the same and a part above the same which parts are substantially parallel, and the effigy of a mouse attached to that part of said rod which is in the cage, the arrangement being such that when the rod is manipulated from below said effigy is caused to move around in a circle in said cage.

HIRAM C. MOORE.

Witnesses:
ALLEN WEBSTER,
C. J. BROSNAN.